US009614774B2

(12) United States Patent
Basilier

(10) Patent No.: US 9,614,774 B2

(45) Date of Patent: Apr. 4, 2017

(54) METHOD FOR PROVIDING A QOS PRIORITIZED DATA TRAFFIC

(71) Applicant: TELEFONAKTIEBOLAGET L M ERICSSON (PUBL), Stockholm (SE)

(72) Inventor: Henrik Basilier, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/385,016

(22) PCT Filed: Mar. 13, 2013

(86) PCT No.: PCT/EP2013/055100

§ 371 (c)(1),
(2) Date: Sep. 12, 2014

(87) PCT Pub. No.: WO2013/135753

PCT Pub. Date: Sep. 19, 2013

(65) Prior Publication Data

US 2015/0043350 A1 Feb. 12, 2015

Related U.S. Application Data

(60) Provisional application No. 61/610,548, filed on Mar. 14, 2012.

(51) Int. Cl.

| | |
|---|---|
| ***H04L 12/851*** | (2013.01) |
| ***H04L 12/46*** | (2006.01) |
| ***H04L 29/06*** | (2006.01) |

(52) U.S. Cl.

CPC ...... *H04L 47/2441* (2013.01); *H04L 12/4633* (2013.01); *H04L 12/4641* (2013.01); *H04L 47/24* (2013.01); *H04L 63/0272* (2013.01)

(58) Field of Classification Search

CPC ............. H04L 63/0272; H04L 12/4633; H04L 47/2441; H04L 12/4641; H04L 47/24

See application file for complete search history.

(56) References Cited

U.S. PATENT DOCUMENTS

| | | | | |
|---|---|---|---|---|
| 7,292,577 B1 * | 11/2007 | Ginipalli | H04L 45/306 | 370/392 |
| 2002/0075844 A1 * | 6/2002 | Hagen | H04L 63/0442 | 370/351 |
| 2005/0265308 A1 * | 12/2005 | Barbir | H04L 12/4641 | 370/351 |
| 2008/0076425 A1 * | 3/2008 | Khetawat | H04W 88/12 | 455/436 |
| 2009/0003223 A1 * | 1/2009 | McCallum | H04L 12/4633 | 370/244 |

(Continued)

*Primary Examiner* — Brian D Nguyen

(74) *Attorney, Agent, or Firm* — Rothwell, Figg, Ernst & Manbeck, P.C.

(57) ABSTRACT

A method for transmitting data packets of a data traffic between a sending device (10, 80) and a receiving device (80, 10) via a VPN client (200) and a VPN server (500) over a network using a secure encapsulation of the data packets, the method comprising the steps of determining a Quality of Service, QoS, parameter for the data packets of said data traffic, selecting, for the data packets, either a first tunnel (91) connecting the VPN client (200) and the VPN server (500) or a second tunnel (92) connecting the VPN client (200) and the VPN server (500) based on determined Quality of Service.

23 Claims, 12 Drawing Sheets

(56) References Cited

U.S. PATENT DOCUMENTS

| | | | | |
|---|---|---|---|---|
| 2009/0304003 | A1 | 12/2009 | Huynh Van et al. | |
| 2010/0309784 | A1* | 12/2010 | Mihaly | H04L 12/5692 370/230 |
| 2011/0078783 | A1* | 3/2011 | Duan | H04L 12/4633 726/15 |
| 2011/0134925 | A1* | 6/2011 | Safrai | H04L 49/35 370/395.53 |
| 2012/0057464 | A1* | 3/2012 | Nakata | H04L 45/00 370/237 |

* cited by examiner

METHOD FOR PROVIDING A QOS PRIORITIZED DATA TRAFFIC

CROSS REFERENCE TO RELATED APPLICATION(S)

This application is a 35 U.S.C. §371 National Phase Entry Application from PCT/EP2013/055100, filed Mar. 13, 2013, designating the United States, and also claims the benefit of U.S. Provisional Application No. 61/610,548, filed Mar. 14, 2012. The disclosures of both applications are incorporated herein in their entirety by reference.

BACKGROUND

The mobile spectrum is a shared and scarce resource. This leads to congestion situations which penalizes end user traffic with higher latency. For some services this is not acceptable and there is even a willingness from e.g. service providers or enterprises to pay for prioritization of selected service traffic in order to avoid the negative effects of congestion.

In mobile communication networks it is known to direct network traffic related to a specific service to a bearer with a certain quality of service (QoS). In this respect, a bearer is considered to be an information transmission context or path of defined characteristics, e.g. capacity, delay and/or bit error rate. Typically, a number of bearers will be established between a gateway of a mobile communication network and a user equipment, e.g. a mobile phone or other type of mobile terminal. A bearer may carry downlink (DL) data traffic in a direction from the network to the user equipment, and may carry data traffic in an uplink (UL) direction from the user equipment to the network. In the gateway and in the user equipment the data traffic, which includes a plurality of IP data packets (IP: "Internet Protocol") can be filtered using IP 5-tuple packet filters, thereby directing the IP data packets to a desired bearer.

Specifically, it is desired to direct data traffic relating to a specific service, e.g. mobile TV, to a bearer offering a certain QoS. For this purpose, DL data traffic may be subjected to a packet inspection so as to identify data packets relating to a specific service. When data packets of a predefined service are detected, this may be signaled to a policy controller. The policy controller may then generate corresponding packet filters and signal these packet filters to the gateway. The gateway then uses the received packet filters to route the data packets to a desired bearer. The bearer typically has a QoS class which was chosen by the network operator for the specific service. In this process, there may also be signaling to the user equipment, e.g. for establishing the bearer and indicating UL packet filters to the user equipment, which should be used to route UL data traffic onto the bearer.

Thus, to achieve this prioritization, packet inspection technologies are employed, either shallow/header inspection and/or deep packet inspection, This is a perfectly reasonable approach as long as it is possible to perform the necessary packet inspection.

However, when traffic is VPN encapsulated (e.g. using IPSec or SSL), as enterprise traffic often is, this packet inspection is not possible, as the service related data is hidden with the encapsulated, often encrypted packet. This is illustrated by FIG. 1, showing that the VPN traffic can be transported on one bearer since the VPN packets are encapsulated in a way making the packet inspection impossible.

In. FIG. 1 a client 10 which could also be an application or a web page 10 would like to exchange data with either a public web server 80 or an enterprise server 60. For VPN encapsulation a VPN client 20 is provided transmitting data to a VPN server 50 via a traffic detector mapper 30. A traffic detector/mapper 40 in the network domains is provided. At the VPN server side a firewall 70 is additionally provided. A tunnel is generated between the VPN client and the VPN server. Neither traffic mapper 30 nor traffic mapper 40 can inspect the encapsulated packets.

This is a type of problem that exists with all kind of QoS for tunneled traffic. Therefore many routers have features to deal with it (to a limited degree), Cisco for instance calls it pre-classification. With this approach the packet is inspected before encapsulation and the result is "remembered" such that e.g. QoS policies can be applied on the outgoing tunneled packet.

The problem however with such schemes is that they are very local (within a router) and e.g. don't work over organization boundaries. Also they are not specifically addressing client VPNs, but are typically applied where VPNs are used as part of a network setup (site-to-site).

SUMMARY

In order to enable a provision of prioritized data traffic of data packets in a network using encapsulation by transporting data packets, like for example a VPN (Virtual Private Network), a mechanism is specified for selecting and distinguishing data traffic belonging to prioritized service before the secure encapsulation is done.

According to a first aspect, a method for transmitting data packets of data traffic between a sending device and a receiver device over a VPN client and a VPN server is provided, wherein the data are transmitted over a network using a secure encapsulation of the data packets. According to one step, a quality of service (QoS) parameter for the data packets of the data traffic is determined and either a first tunnel is selected for the data packets connecting the VPN client and the VPN server or a second tunnel is selected connecting the VPN client and the VPN server based on the determined quality of service. Depending on the required quality of service, the data packets of a data traffic can be sent through a first tunnel or a second tunnel, both tunnels connecting the VPN client and the VPN server.

It is possible that the selection of the first or second tunnel is carried out by the VPN or the VPN server. In this embodiment the determination of the quality of service and the selection of the first or second tunnel in dependence on the determined quality of service takes place in the VPN client or VPN server.

The first tunnel may provide a different quality of service than the second tunnel, by way of example one tunnel may provide a better service class, e.g. a higher throughput than the other tunnel.

It is furthermore possible that a single IP address is assigned to a virtual interface where the data packets of the data traffic are received at the VPN client from the sending device. The single IP address is the tunnel end point at the VPN client. This can mean that the single IP address is the same for the data packets of the data traffic transmitted through the first or the second tunnel and it corresponds to the source address of the inner IP header of the tunneled data packets. In this embodiment the data are transmitted in the uplink direction from the client to the server. For the downlink direction the single IP address is also the same for the data packets of the data traffic transmitted through the first or second tunnel and corresponds to the destination address of the inner IP header of the tunneled data packets.

In a tunneled data packet, the inner IP header contains the usual source and destination address, whereas in the tunnel entrance the outer IP header is added containing the IP address of the tunnel end points. In the embodiment described above, the two tunnels connecting the VPN client and the VPN server have at the VPN client side a single IP address. At the VPN server side the two tunnels may also have a single IP address. In order to differentiate the different tunnels, the two tunnels may have at the VPN server side a different port number. However, they may also have the same port number and the tunnels may only differ in using an identifier which is included into a tunnel header. The tunnel header is in addition to the outer and inner headers comprised in a tunneled packet.

The two tunnels can be requested by the VPN client and the single IP address is assigned to the two tunnels at the VPN client by the VPN server.

In another embodiment the selection of the first or second tunnel which connects the VPN server and the VPN client can be carried out in a traffic mapping unit which then transmits the information about the selected first second tunnel to the VPN client or VPN server. This traffic mapping unit is a high-level traffic mapping unit which is able to inspect the data packets before encapsulation at the VPN client or VPN server.

In this embodiment it is possible that two IP addresses are assigned to the VPN client. The data packets are sent to a first IP address and a first virtual interface at the VPN client or they are sent to a second IP address of a second virtual interface at the VPN client in dependence on the determined QoS parameter. One IP address is then associated with each of the tunnels at the VPN client.

The data traffic contains a source and a destination IP address. It is possible that when the QoS parameter is determined, the source IP address is translated to either the first IP address or the second IP address in dependence on the determined QoS parameter in the mapping unit where the data packets are then sent to the VPN server. When the data packets are transmitted to the VPN client and when the QoS parameter is determined, the destination IP address can be translated to either the first IP address or the second IP address in dependence on the determined QoS parameter. In this embodiment the traffic mapping unit, after having determined the QoS parameter, either selects the first tunnel or the second tunnel at the VPN client or the VPN server to transmit the data packets of the data traffic. In this embodiment the two tunnels may have two different IP addresses on the VPN client side and on the VPN server side.

At the tunnel exit the transmitted IP address may be translated back to the source address at the traffic mapping unit at the VPN server or to the destination address at the traffic mapping unit at the VPN client.

Preferably, the QoS parameter is determined at a first layer, where the data traffic with the determined QoS parameter is provided to a second layer located below the first layer in a protocol stack. In a second layer the data packets are mapped either to the first second tunnel and the data are then transmitted in a third layer. The third layer can be below the second layer in the protocol stack.

The invention furthermore relates to a virtual private network node configured to transmit the data packets of the data traffic between a sending device and a receiving device via another virtual private network node over a network, wherein the data packets use a secure encapsulation between the two VPN Nodes when being sent over the network. The virtual private network node comprises a quality determining module configured to determine the QoS parameter for the data packets of the data traffic. Further, a tunnel module is provided configured to set up the first tunnel connecting the virtual private network node with the other virtual private network node and configured to set up a second tunnel connecting the virtual private network node with the other virtual private network node. Furthermore, a control module is provided configured to select either the first tunnel or the second tunnel before the data traffic based on the determined quality of service. In this embodiment the QoS parameter is determined in the virtual private network node, which is either the VPN client or the VPN server.

The invention furthermore relates to a system comprising a VPN client and a VPN server configured to transmit data packets of a data traffic between a sending device and a receiving device via the VPN client and the VPN server over a network using a secure encapsulation of the data packets between the VPN client and the VPN server. The system comprises a quality determining module configured to determine the QoS parameter for the data packets of the data traffic. Further, a tunnel module is provided configured to set up the first tunnel connecting the VPN client with the VPN server and to set up the second tunnel connecting the VPN client with the VPN server. The control module is configured to select either the first tunnel or the second tunnel for the data traffic based on the determined quality of service. The tunnel module can be configured in such a way that it sets up the first tunnel and the second tunnel in such a way that the two tunnels have a single IP address at the VPN client. The above-mentioned components of the system, the quality determining module, the tunnel module and the control module, may be provided at the VPN client, at the VPN server or at the VPN client and the VPN server.

Additionally, the tunnel module can be configured in such a way that the first tunnel and the second tunnel also have a single IP address at the VPN server. In this embodiment the two tunnels may have a different port number at the VPN server. However, they may also have the same port number. In this example they are differentiated using an additional identifier which can be provided in the tunnel header.

According to another aspect of the invention, a traffic mapping unit is provided comprising a quality determining module configured to determine a QoS parameter for data packets of a data traffic transmitted between a sending device and a receiving device via a VPN client and VPN server using a secure encapsulation of the data packets between the VPN client and the VPN server. A control module of the traffic mapping unit is configured to select for a data traffic either a first IP address of the VPN client and which is associated with a first tunnel connecting the VPN client with the VPN server or a second IP address which is different to the first IP address of the VPN client and which is associated with a second tunnel connecting the VPN client with the VPN server based on the determined quality of service. A transmitter of the traffic mapping unit is then configured to transmit the data traffic to either the first or second IP address at the VPN client or a server based on the selection of the control module. In this embodiment the traffic mapping unit is responsible for the determination of the quality of service and the traffic mapping unit selects the first or the second tunnel at the VPN client or VPN server by transmitting the traffic either to the first or the second IP address of the VPN server or VPN client.

The traffic mapping unit may furthermore comprise an address translating unit configured to translate the source and/or destination IP address in the header of the data traffic. The address translating unit can be configured to translate the source IP address to either the first IP address or the second IP address in dependence on the determined QoS parameter when the data packets are sent to the VPN server. When the data packets are sent to the VPN client, the address translating unit can translate the destination IP address to either the first IP address or the second IP address in dependence on the determined QoS parameter.

The traffic mapping unit can be configured in such a way that it determines the QoS parameter before the secure encapsulation of the data packets is carried out at the VPN client or the VPN server.

The invention furthermore provides a traffic mapping unit as mentioned above and a VPN client.

In general terms the disclosure proposes a method for providing a QoS prioritized data traffic data traffic between a sending device (e.g. client device in the uplink direction and an application server in the downlink direction) and a receiving device (e.g. an application server in the uplink direction and client device in the downlink direction) over a network using a secure encapsulation while transporting data packets of said data traffic. The received data traffic is distinguished and classified on a first layer by deciding on the QoS class. As next said classified data traffic is provided to a second layer being located below the first layer in a protocol stack in such a way that the individual data packets resulting form the classified data traffic are adapted to be mapped to corresponding data packet tunnel means, wherein the data packet tunnels means is adapted to distinguish the identified QoS classes. As next the secure encapsulation of the data packets is performed and the data packets are provided to a third layer for sending said data packets into the network. (FIG. 6)

The data packet tunnel means may be realized in any suitable and preferable way. In one embodiment it is proposed to establish at least two tunnels for transporting of the data packets. It is to be mentioned that a tunnel is usually established between communicating points and is uniquely identified. In one embodiment it is proposed to establish at least two IP tunnels, wherein the IP tunnels are specified by a unique IP address. Usually the tunnel is established by the client either by its own initiative or as a result of a request from the network side.

In a further embodiment it is proposed to use different marking schema for marking the data packets belonging to prioritized data traffic and by sending the data packets over one tunnel.

The first protocol layer may be any protocol layer receiving data traffic. The data traffic may be organized as IP data packets. The second protocol layer may be any protocol layer providing the data traffic as data packets and performing the secure encapsulation, so examples would be encapsulation within SSL or IPSec.

In an embodiment, a sending device of the telecommunication system can be adapted to the method. In this case the device comprises a receiver for receiving data traffic from a first protocol layer, a high level traffic mapper (packet inspector) for distinguishing the data traffic and for classifying the data traffic by deciding on a corresponding QoS class, a processing unit at a second protocol layer being located below the first layer in a protocol stack being arranged to map the individual data packets resulting form the classified data traffic to corresponding data packet tunnel means, wherein the data packet tunnel means is adapted to distinguish the QoS classes, an encapsulation unit for secure encapsulation of the data packets and a sender for providing the data packets to a third layer for sending said data packets into the network. (FIG. 7)

In one embodiment it is proposed that the sending device is a mobile device, when an uplink is provided. In a further embodiment it is proposed that the device is a server, when the downlink is to be realized.

In one embodiment the processing unit at a second protocol layer being located below the first layer in a protocol stack being arranged to map the individual data packets resulting form the prioritized data traffic to corresponding data packet transport means is a VPN Client/Server In a further embodiment a method for providing a QoS prioritized data traffic between a sending device and a receiving device over a network using a secure encapsulation while transporting data packets of said data traffic is provided. Said method has the following steps: receiving data packets from a network received on a data packet tunnel means on a third layer, providing the data packets to a second layer for removing the encapsulation; providing the data packets to a first layer; performing on the first layer the distinguishing of the different QoS classes; providing the data traffic to the application destination by mapping the different QoS classes to the application destination.

In a further embodiment a receiving device adapted to provide a QoS prioritized data traffic between a client device and an application server over a network using a secure encapsulation while transporting data packets of said data traffic is provided. Said device comprises a receiver on the third layer adapted to receive data packets from a network received on a data packet tunnel means, a first processor adapted to remove an encapsulation of the data packets in a second layer; a second processor adapted to distinguish the different QoS classes and to map the different QoS classes to the application destination.

In one embodiment it is proposed that the receiving device is a mobile device, when an uplink is provided. In a further embodiment it is proposed that the device is a server, when the downlink is to be realized.

Furthermore a system is proposed with a sending device communicating with a receiving device, wherein the communication may be performed either in uplink or in downlink direction. The sending device is adapted to perform the method as described above and the sending device the respective method as described above.

The aforementioned sending and receiving devices (and other elements of the telecommunications system) can be implemented by at least one microprocessor coupled to a non-transitory computer-readable medium. The non-transitory computer-readable medium includes computer-readable instructions, when executed by the at least one microprocessor, implements the methods described herein.

BRIEF DESCRIPTION OF THE DRAWINGS

The invention will be described in further detail with reference to the accompanying drawings. In these drawings

DETAILED DESCRIPTION

A simplistic approach to solving the issue would be to let the client initiate two independent VPN tunnels for prio vs non-prio traffic. This would however result in a situation where two independent IP addresses are assigned to the client, and where the applications would have to be equipped with the intelligence of deciding which address to use depending where prio should be applied or not. This is deeply undesirable, as this should be left transparent to the applications as far as possible (and it is not desirable from a business perspective).

In the following text more detailed examples of the embodiments are described in the terms of an VPN system. However, it is to be understood that this description can be generalized to other systems in line with the general features as described under the basic concept. Some examples for such generalizations are indicated in the following text. Thus, any network using a specific encapsulation may be considered.

Figure 2:
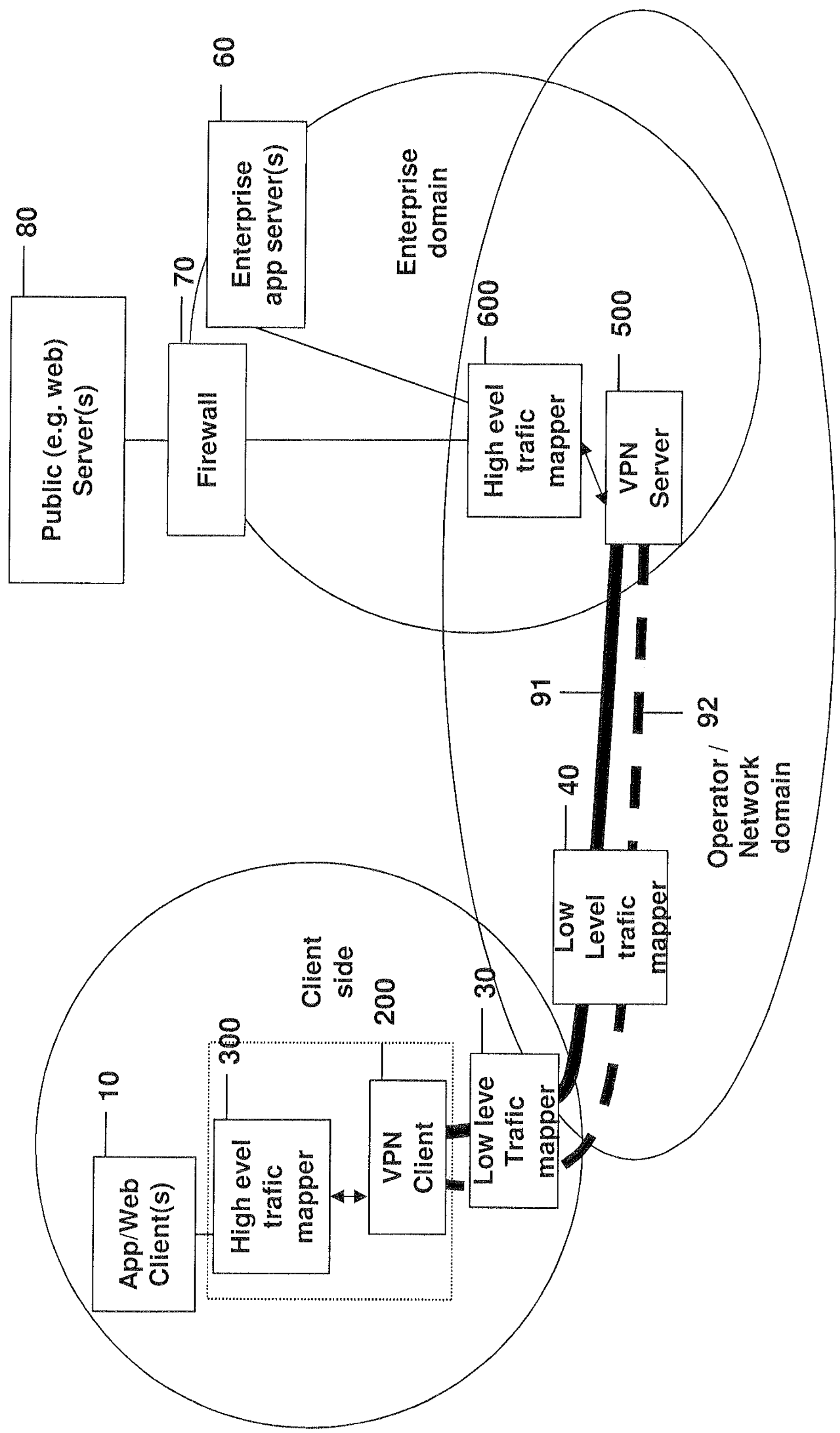
FIG. 2 is a schematic view of a system incorporating the features of the invention where data packets of a data traffic are transmitted over a first tunnel or a second tunnel in dependence on a determined QoS parameter.

The basic idea is illustrated by FIG. 2, and consists of two key components:

The use of (at least) two individual tunnels, alternative different marking schemes for the packets, making it possible for a low level traffic mapper (packet inspector) to assign different QoS treatment for the different. This requires specialized VPN Client and Server.

A high level traffic mapper (packet inspector) that based on service knowledge maps traffic to different classes and communicates this classification to the VPN Client/Server in such a way that individual packets can be mapped to different tunnels/marking schemes.

Figure 1:
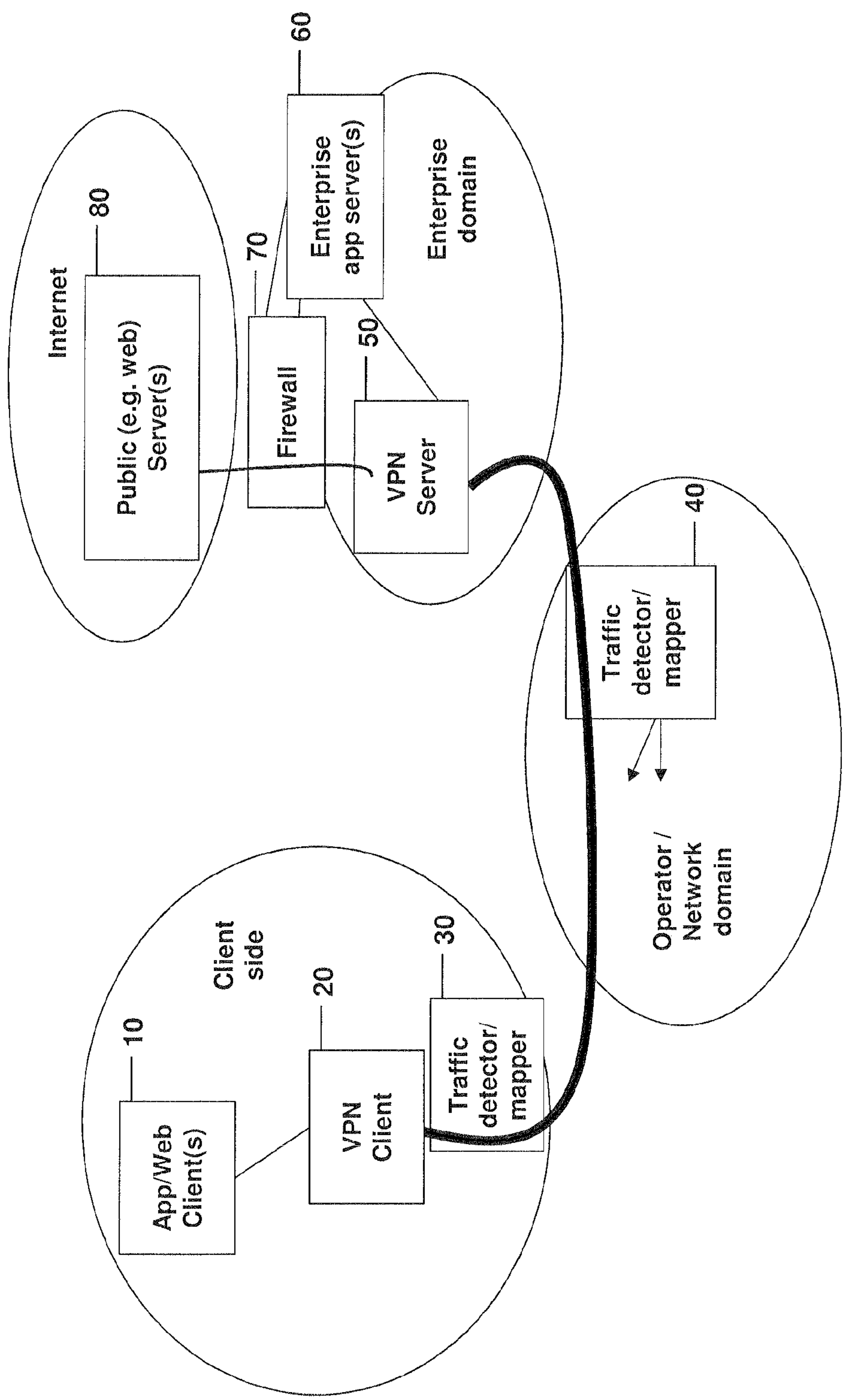
FIG. 1 shows a schematic overview as known in the art where data packets are transmitted using a secure encapsulation via a VPN client and a VPN server.

As illustrated in FIG. 2 it is proposed that the App/Web Client 10 sends a data traffic to the High level traffic mapper 300 for classifying the data traffic based on the knowledge of the service to a corresponding prioritization class. The high level mapper 300 could be realized in different ways, consistent with well established methods of classifying traffic. It could for instance be realized as an application level proxy, with built in knowledge of the application. Alternatively it could be a deep packet inspection entity, programmed with rules to detect certain application flows that are decided to be prioritized. This packet inspection could even be as simple as relying on packet header inspection (well known IP destinations, port numbers etc.) In the next step the data traffic is provided to the VPN client 200 being adapted to map the data packets resulting from the received prioritized data traffic to a corresponding transport means. In the next step the data packets of the individual transport means are mapped to the corresponding priority bearer in a low level traffic mapper 300. This could for instance be the mechanisms defined within 3GPP, as realized by the GGSN/PDN GW and PCRF entities. For more information see e.g. 3GPP Specs 23.207, 29.211 and 29.212, From the VPN client 200, the packets are transmitted to the VPN server 500 either via a first tunnel 91 or a second tunnel 92 from where the data are transmitted to the high level traffic mappers 600. The other components, such as the server 60, the firewall 70 and the public server 80 correspond to the components shown in FIG. 1.

Applicability to Different VPN Technologies

There are different VPN technologies, including IPSec and SSL VPNs. The idea presented here can be applied to both, even though the technical details may vary.

Tunneling/Marking

One way of adapting the VPN client/server would be to e.g. establish (at least) two separate tunnels from the client to the VPN server, and these are then selectively used for prioritized vs non-prioritized traffic. These two tunnels would differ in the identification of the end points of the tunnels e.g. by using different IP address and/or port numbers.

Example Realization 1

Client establishes a SSL connection to the server. It can e.g. find the IP endpoint (of the server) using dns (lookup of e.g. "gw1.somedomain.com"). This SSL connection can be used to authenticate the client (using any mechanisms currently used for SSL VPNs), to present a portal to the user, as well as other exchange (e.g. application gateways). This user (or the client) decides to use this SSL connection for VPN tunneling and initiates some procedures to facilitate the tunneling, to exchange IP addresses etc. (the tunneling over SSL is today proprietarily implemented). Once this (first) tunnel is established, the client initiates (by own initiative or as triggered e.g. by the HL mapper) a second SSL connection to be used for tunneling (e.g. of prioritized data). This SSL connection is established towards a second IP address (e.g. found using DNS lookup of gw2.somedomain.com"), preferably without end user interaction (should be transparent to end user). The establishment of tunneling over this SSL connection could be similar to the first one, the allocation of a new IP address could though possibly be omitted.

Example Realization 2

The first SSL VPN and tunnel is established in a similar way as the previous example. In this case however, the client and the server negotiate to have a second tunnel identified by port numbers rather than IP addresses. It could be by using a different port on the sever side (different than the standard port 443 used for SSL), or by using different ports on the client side.

Another variant would be to continue using a single tunnel, but to instead mark the outgoing packets, e.g. using DiffServCodepoints (DSCP) that would then be used by the low level traffic mapper.

Example Realization 3

A first SSL VPN tunnel is established in a similar way as for 1. The client and server negotiate to use DiffServ marking to mark packets that are supposed to be prioritized. Alternatively this is predetermined by the implementation (not negotiated)

Similar solutions can be designed for e.g. the IPSec case.

Different Models for Functional Distribution

Based on the model with a high level mapper interacting with a specialized VPN Client/Server, it is possible to split the functionality in different ways, as described below. These are merely two different variants of the invention, with respective advantages.

VPN Client and Server Centric Model

In one embodiment it is proposed to provide more intelligence in the VPN client or respectively in the VPN server.

In the state of the art, a VPN client would only establish a single tunnel. Normal behavior of the client to server interaction is to associate and assign one IP address to the client requesting the tunnel (making the client logically part of a subnet on the server side). Therefore having at least two tunnels with at least two IP addresses assigned to the client and visible to the client IP stack is not really desirable.

One way to avoid this dilemma is to adopt the client and server behavior such that only a single IP addresses is presented to the upper layer (IP stack), even though two individual tunnels are actually established and used.

Figure 3:
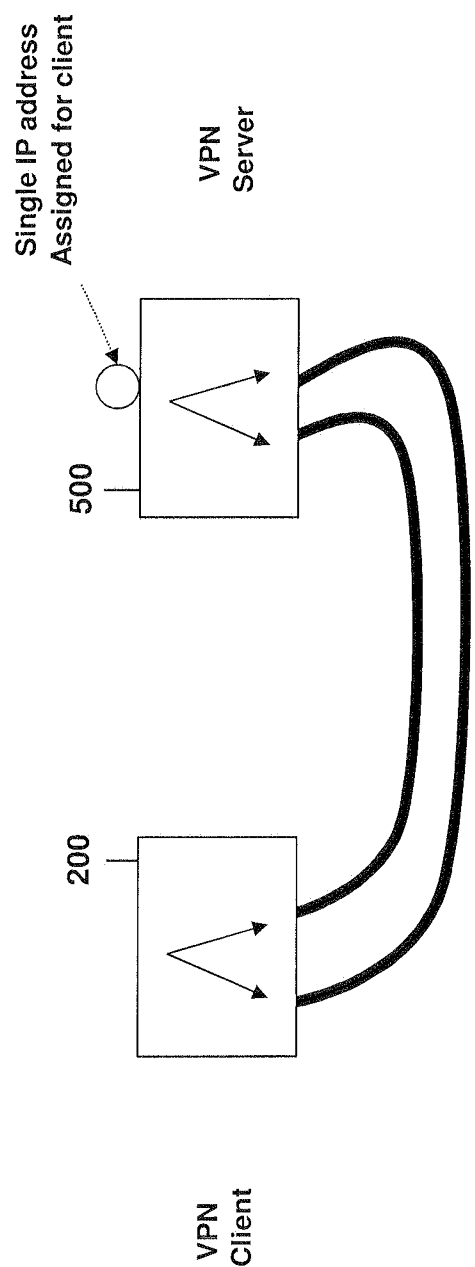
FIG. 3 shows an embodiment where the VPN client or VPN server determines the quality of service and selects either a first tunnel or a second tunnel.

Thus, according to one embodiment it is proposed to classify the received data traffic to a corresponding QoS class. The classification is done after distinguishing the data traffic by using the knowledge of the application or by doing packet inspection. In order to classify the data traffic, it is proposed in this model to mark the data packets in the HL packet mapper according to the QoS class. Thus, in this embodiment the classification comprises marking of the data packets according to the QoS class. For marking the data packets any suitable and preferably method may be used. For example the data packets may be marked in a header of the data packets. In a further step the classified and marked traffic is to be mapped to a corresponding tunnel. Thus the marked data packets are provided to a second layer, to the VPN client 200 or respectively to the VPN server 500. Which tunnel to use for an outgoing packet in the VPN client/server is based on marking of the incoming packet. This is illustrated by FIG. 3. FIG. 3 illustrates a VPN client which receives marked data packet from the high level mapper, selects the data packets and sends them to the corresponding tunnel. In another embodiment it is proposed to send the differently marked data packets to one tunnel. In this example the data packet tunnel means is one tunnel, which distinguishes the identified QoS classes according to the chosen marking. In one example it is proposed to keep the marking by sending the data packets or in another example a remarking of the data packets may be performed before encapsulating the data packets.

On the receiving side, in case of the uplink communication on the server side, the VPN Server receives the data packet, decapsulates it (removing any added markings) and forwards the packets to the HL mapper (if needed) and onwards to the destination application.

The data packets may be received either on one tunnel or on at least two tunnels depending on the realization of the data packet tunnel means. Further it is proposed that the data packets are provided to the HL mapper, which is an embodiment provided on the first layer for distinguishing of the different QoS classes and for providing the data traffic to the application destination by mapping the different QoS classes to the application destination. In this model it is proposed that the receiving side has the knowledge on mapping of the used marking to the IP address as used on the receiver side.

Further it is to be mentioned that the described model works also when the provision of the prioritised data is performed on the server side and the receiving device is the client device.

An advantage of this model is that the High level mapper would be much less dependent on proxy capabilities and could (possibly) be implemented as a Deep Packet Inspection entity.

Figure 12:
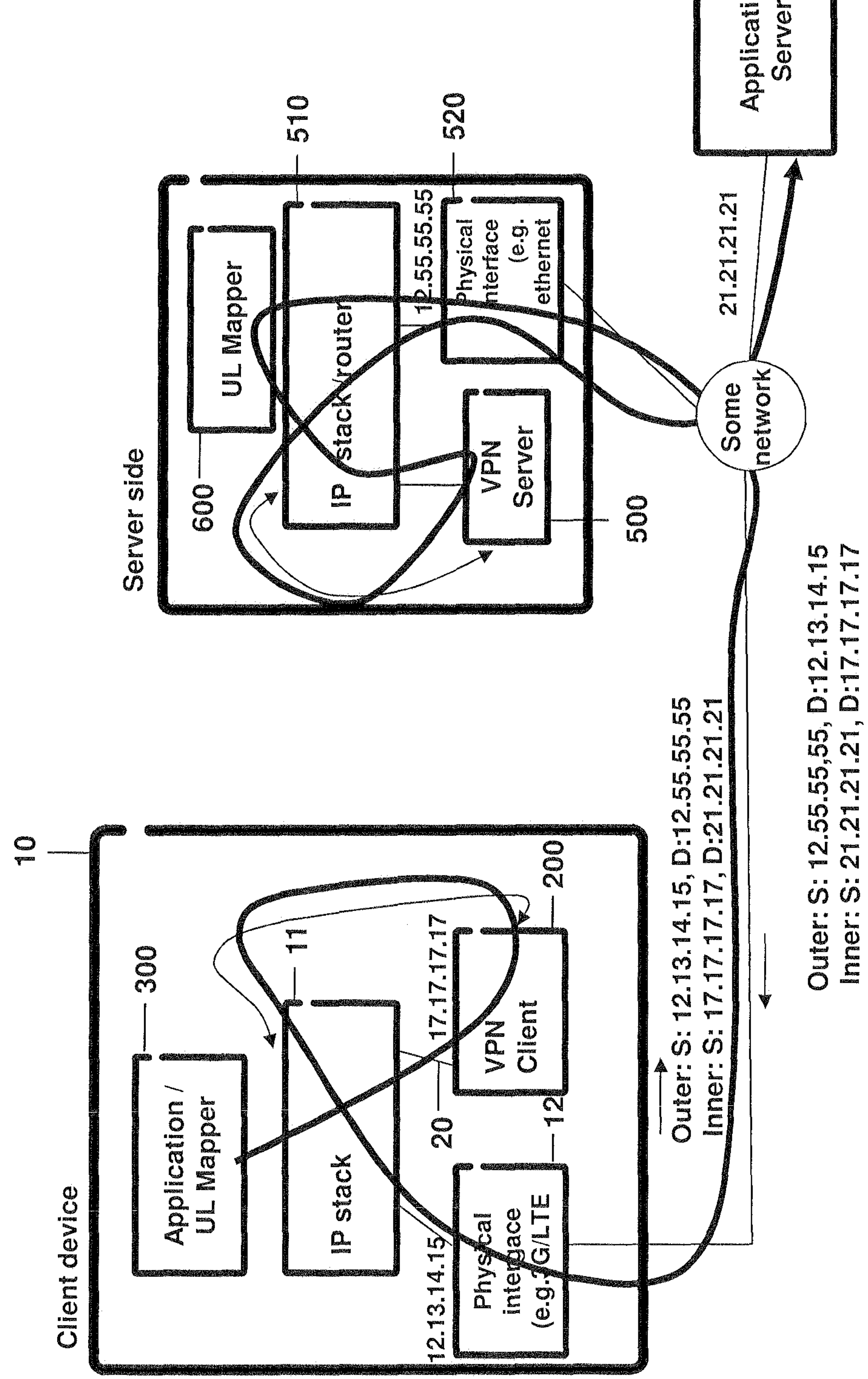
FIG. 12 is a schematic view of a data traffic in an embodiment where the VPN determines which tunnel is to be used.

In the embodiment shown in FIG. 3 a single IP address is assigned for the client by the VPN server. The single IP address is assigned to a single virtual interface from the VPN client upwards. In the embodiment of FIG. 3, as mentioned above the VPN client or the VPN server have to determine to which tunnel to send the packets. In FIG. 12, a more detailed view of the embodiment disclosed in FIG. 3 is shown. Data packets from the client device 10 are transmitted to an application server 16 shown in FIG. 12. As mentioned above, the data packets come from the traffic mapping unit 300 where a marking was introduced about the prioritization of the traffic, the packets being transmitted through the IP stack 11 of the client device. A virtual interface 210 is an interface at which the packet arrives at the VPN client. The arriving packets are the original packets before the outer header is added at the VPN client 200. The inner header of the client has a source address which the IP address of the virtual interface, here the number 17.17.17.17. The destination of the data packets is the application server with the IP address 21.21.21.21. Thus, as shown in FIG. 12 the inner header comprises these two IP addresses. At the VPN client 200 the outer header is added, here the IP address of the physical interface as source and the physical interface IP address at the VPN server. For a transmission in the other direction from the application server to the client the IP addresses are exchanged as can be seen in the lower part of FIG. 12 where the transmission from the server 60 to the client device 10 is shown. The client device 10 contains a physical interface 12 and the server contains a physical interface 25 with an IP stack 15, the upper layer mapper 600 being shown in the server side.

In the embodiment shown in FIG. 12, only a single tunnel connecting the VPN server to the VPN client is shown. However, this is only for the sake of clarity, as two tunnels are provided, the other tunnel, the non-selected tunnel not being shown in FIG. 12. In the embodiment where the decision which tunnel to use is taken in the VPN client, a single IP address is used for both tunnels at the VPN client side. At the server side it is also possible to use a single IP address. In this embodiment the two tunnels may then be differentiated using a port number or using an identifier in the additional tunnel header not shown in FIG. 9 but which is additionally present in each tunneled packet. In the embodiment shown in FIGS. 3 and 12 the header of the tunnel differs in the IP 5 tuple. The two tunnels at the server side either have a different IP address or a different port number, or a different marking contained in the tunnel header.

High Level Mapper Centric Model

An alternative approach/embodiment can allow the use of two independent tunnels where both gets IP address assigned to them. It could be preferable, in order to minimize impacts on the VPN client. In this case, more intelligence is moved up to the high level mapper function.

In this case, the high level mapper (client) can instruct the VPN client to request two tunnels with two independent IP addresses assigned. The high level mapper can then ensure that this is sufficiently transparent to applications although both is used for the underlying communication.

At first, the HL distinguishes the data traffic by using the knowledge of the application or by doing packet inspection. In the next step the classification of the distinguished data packets is to be performed. According to High level mapper centric model approach the classification is based on assigning to the data packets a corresponding IP address relating to a corresponding tunnel. It is proposed to perform an address translation. Thus, the HL mapper will make sure that packets are sent downwards using a different source IP address (when sent from client towards server) or destination IP (when sent from sever to client). These addresses are used by the VPN Layer (Client or Server depending on direction) to map the packets to the right tunnel (each tunnel has an IP address associated therewith), which then in the LL mapper causes packets to be prioritized or not prioritized.

Thus, it is proposed that the HL high mapper performs address translations at both client and server end, such that the addresses look unchanged from an end to end perspective.

Figure 4:
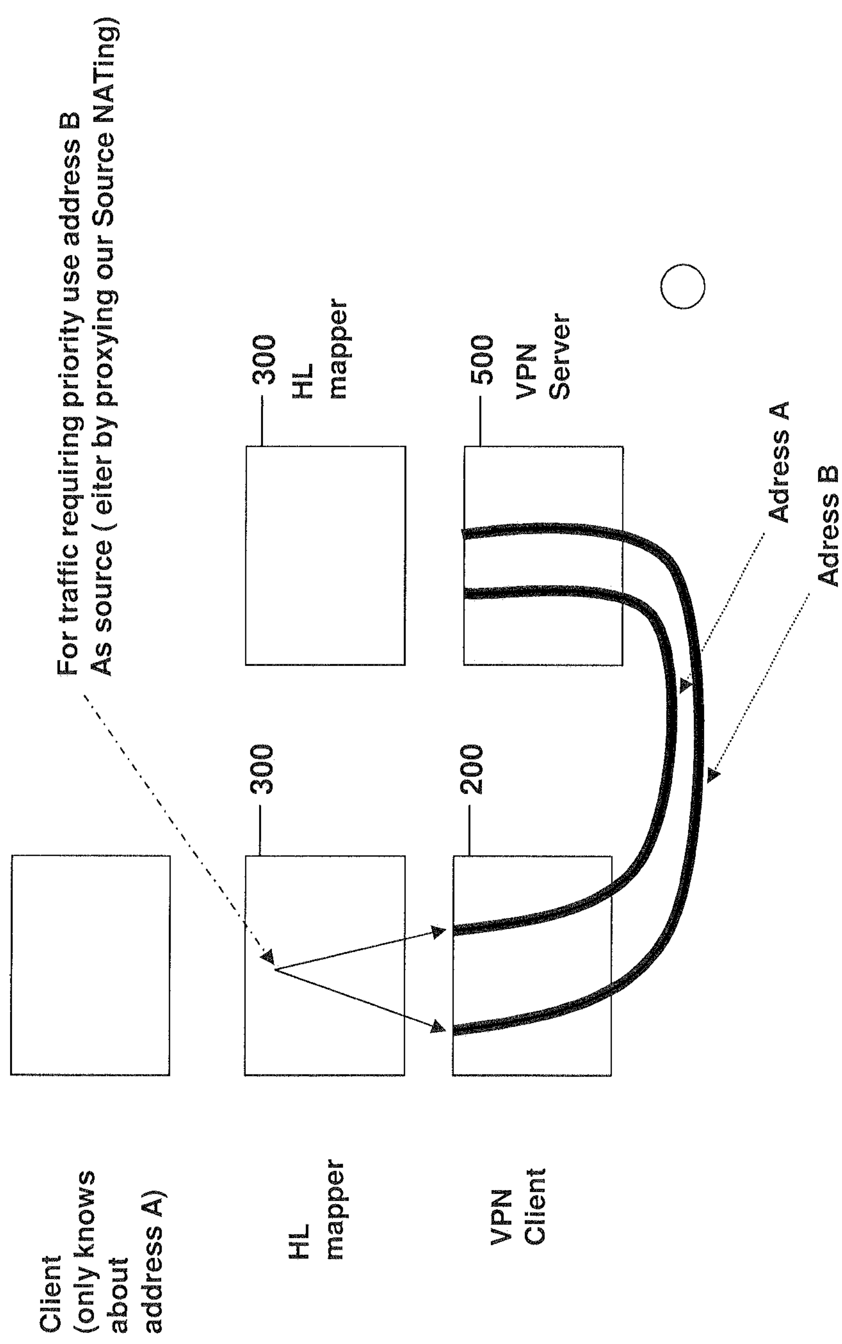
FIG. 4 shows another embodiment where the QoS parameter is determined at a traffic mapping unit which then selects either a first tunnel or a second tunnel at a VPN client or VPN server.

FIG. 4 illustrates a VPN client which receives data packet from the high level mapper 300 with new IP addresses and sends them to the corresponding tunnel with the corresponding IP address. On the server side, the VPN Server receives the data packet, decapsulates it and forwards the packets to the HL mapper (if needed) and onwards to the destination application. Herein by the decapsulating a translation of the IP addresses assigned to the tunnels to the IP address assigned to the client is done, so that only one IP address is shown to the destination.

Another alternative is to simply use both address for network-bound connections, i.e. operate as a proxy. If the applications are of such nature that the network side end point of the communication does not need to see the real client IP address (As source IP for incoming packets), it is not really a problem if the HL mapper functions would use these addresses as source IP when communicating with the network side end points. (Prioritized and non-prioritized flows received by the network side end point would have different source IP). There any a number of methods how the proxy could be implemented. In one embodiment, it may be a HTTP proxy, wherein the HL mapper (acting as a proxy) receives HTTP requests over TCP from the application client, and sends out identical HTTP requests but using different TCP connections and different source IP on the other side (towards the HTTP Server).

In the following the HL mapper centric solution is presented in more details according to FIG. 4 and FIG. 5.

FIG. 4 illustrates the uplink direction for sending data traffic from the client 200 to the server 500. Thus the application on the client side knows only one address for performing a communication in a VPN network, namely the address A. The data traffic is provided to the HL mapper 300 which classifies the data traffic by deciding on the QoS class. A priori the HL mapper requests from the VPN client 200 to establish at least two tunnels for the different QoS class. The VPN client upon establishing of the tunnels provides the corresponding IP addresses to the HL mapper 300. Therefore in this embodiment the classifying step comprises that the HL mapper upon taking a decision on the QoS class may change the source IP address while assigning the classified data traffic to a corresponding tunnel. Consequently the classified data packets carry a new IP address and are forwarded to the VPN client 200 which performs a secure encapsulation of the data packets, for example in an VPN and which sends the data over the established tunnels according to their prioritization. According to FIG. 4 the data are sent either over tunnel using the A address or over the tunnel B using the B address. Thus in this embodiment the data packet tunnel means are two different tunnels A and B, which are adapted to distinguish the identified QoS classes A and B.

Upon reception of the secure encapsulated data packets on the receiver side, thus the server, at first the secure encapsulation is removed in the next step the distinguishing of the different QoS classes is performed by checking the used IP addresses. Further a mapping of the different QoS classes to the application destination is performed by translating the address in the received data packets in the HL mapper 300 into one IP address or in case the HL mapper handles as a proxy, both address are provided to the application.

Figure 5:
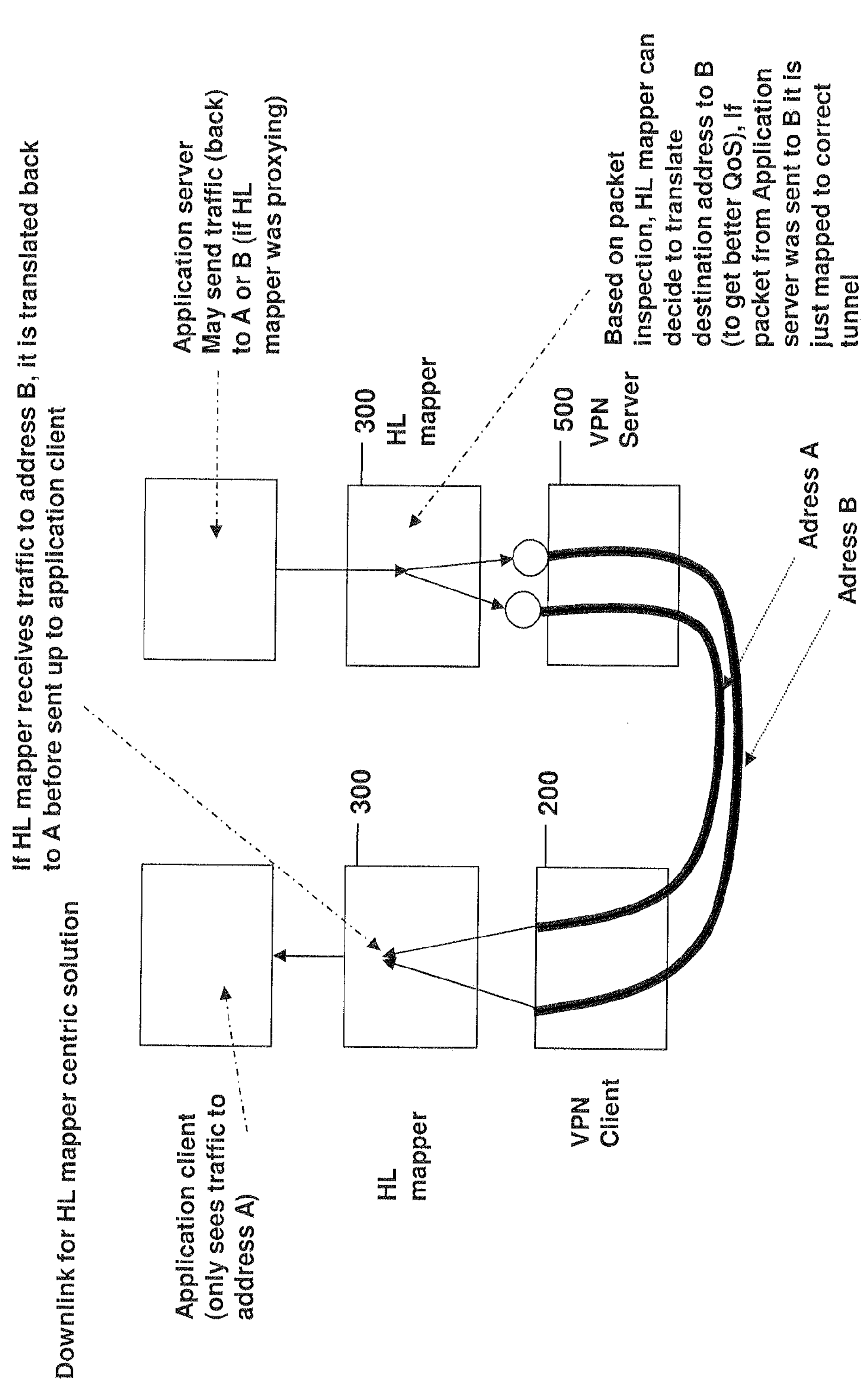
FIG. 5 shows an embodiment for the downlink traffic to the VPN client when the traffic mapping unit determines which tunnel is to be used at the VPN server.

FIG. 5 illustrates the downlink direction for sending data traffic from the server 500 to the client 200. Thus the application on the server side may send to either one address A or to both address A and B in case the HL mapper 300 is a proxy. The data traffic is provided to the HL mapper which inspects and classifies the data traffic by deciding on the QoS class.

Therefore the HL mapper upon taking a decision on the QoS class may change the destination IP address while assigning the classified QoS data traffic to a corresponding tunnel.

If packet from the Application server is sent using directly the B address, then the HL mapper maps the data to the tunnel with the B address. Consequently the classified data packets are forwarded to the VPN server which performs a secure encapsulation of the data packets, for example in an VPN and which sends the data over the established tunnels according to their prioritization towards the client. According to FIG. 5 the data are sent either over tunnel using the A address or over the tunnel B using the B address. Upon reception of the data packets on the client side, the address in the received data packets is translated in the HL mapper to one IP address and forwarded to the application client.

Figure 13:
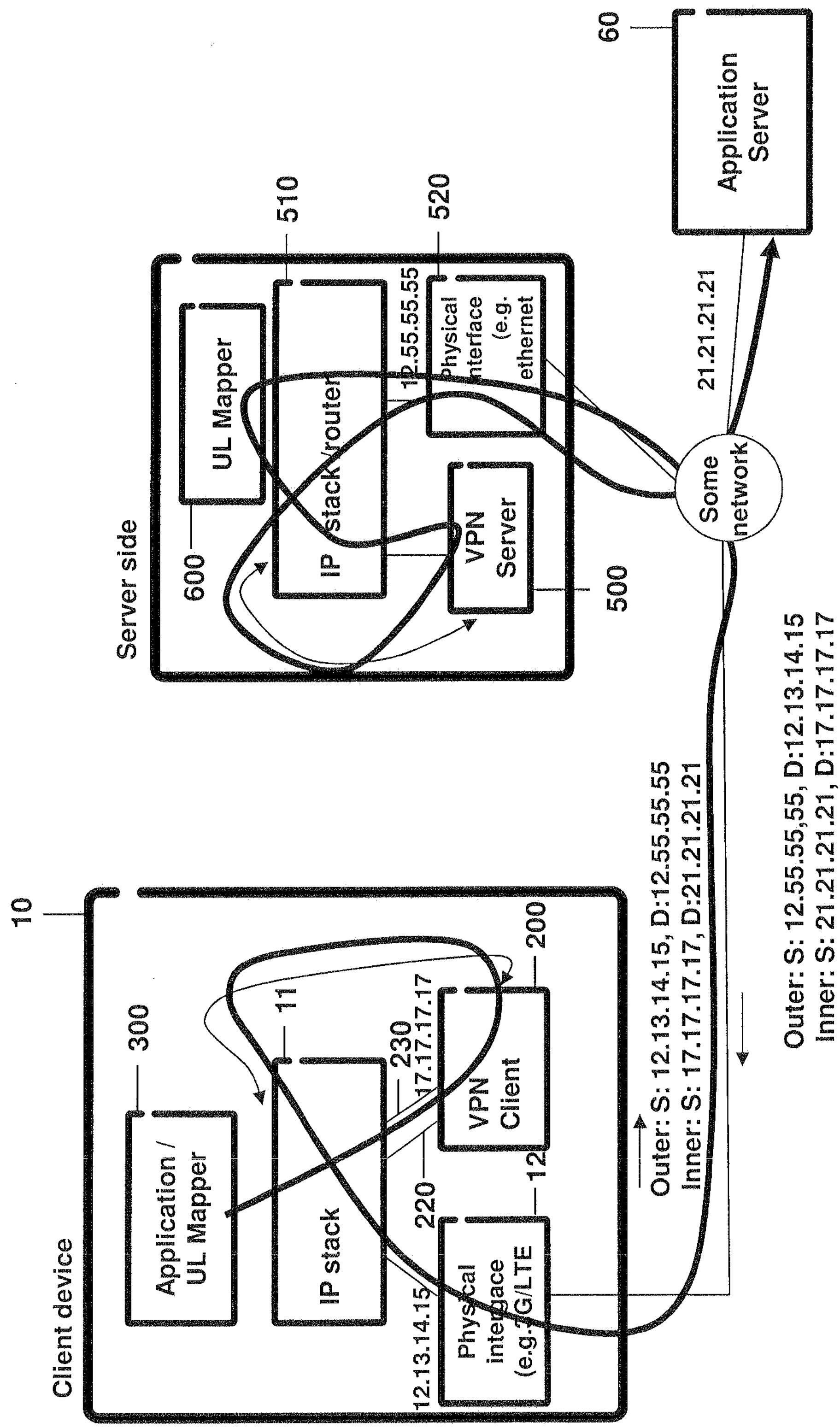
FIG. 13 shows an embodiment where the traffic mapping unit determines which tunnel is to be used.

In FIG. 13, a more detailed view of the embodiment shown in FIGS. 4 and 5 is shown. In this embodiment the upper layer mapper 300 has to ensure that the packets are sent to the VPN client 200 through the right virtual interface, either the interface 220 or 230. As shown in FIG. 13, two virtual interfaces are exposed with two different IP addresses. The traffic mapping unit 300 tells the underlying IP stack which IP address to take, or the IP stack may determine it. However, in general the upper layer mapper can control which of the two IP addresses are used as a source for the tunneled packets, so the traffic mapping unit 300 controls which of the two tunnels is selected. As in the embodiment of FIG. 12 only the selected tunnel is shown, the non-selected tunnel not being shown in FIG. 13. Each of the IP addresses are associated with a tunnel. However, as shown in FIG. 13 the client device will have one IP address, in the example the IP address 12.13.14.15 associated with the physical interface which is used in the outer header and it will have one address associated with each tunnel interface. As can be seen, they are the source addresses of the inner header. At the VPN server either one IP address terminating both tunnel, then using different ports may be used, or it is possible to also use two IP addresses at the VPN server, one for each tunnel. The VPN server also acts as a router/gateway for the clients. Any packets to be routed to the clients, i.e. the address of the virtual tunnel interfaces, will first be routed to the server which will then encapsulate the packet and set the destination address to be the physical address of the client.

Referring back to the client in FIG. 13, the upper layer mapper 300 will have to indicate to the IP stack which IP address should be used as a source.

Control of Mapping

The high level mappers are the ones that are in real control of how traffic is mapped. Therefore, some policy control may be needed. On the network side, it could be hooked up to a policy controller or similar. For the client side, policies would need to be signaled to the HL mapper, using some protocol. This is likely different than for the LL mapper, where e.g. normal 3GPP mechanisms could be used. There is not (likely) any standardized protocol that would completely suit this purpose, so it is therefore likely some proprietary solution, e.g. some exchange using SOAP/XML.

Implementation Alternatives.

The low level mapper is basically a reuse of existing mechanisms dealing with bearer mapping, policy control, bearer triggering etc. In a mobile scenario, the core low level mapper capabilities are implemented by e.g. GGSN/PDN GW along with PCRF. In the context for this invention, the PCRF and GGSN/PDN gateway would for instance be set up to map traffic sent on the prioritized tunnel on a dedicated bearer (e.g. established using 2ry PDP context procedures), and the non-prioritized tunnel over the default bearer.

The PCRF and GGSN/PDN GW could be complemented with an external entity (e.g. a Smart Pipe Controller) performing packet inspection, that when detecting traffic on the prioritized tunnel triggers the PCRF (using Rx) to establish a dedicated bearer. Alternatively it can trigger the PCRF to modify the default bearer. Both this external packet inspector and the GGSN would identify packets sent over a prioritized tunnel based on pre-configured knowledge, either well-known IP addresses, ports or DiffServ CodePoints.

The high level mapper function could either be built into the application (client and server) or it could be deployed as a proxy function. This applies to both the network side and client side. For the client side, it could e.g. interface with the operating system to present a virtual network interface to ensure that all network directed traffic is intercepted and processes by the HL mapper. On the network side, it could either be deployed as a transparent device/proxy (e.g. using policy based routing) or it could be addresses directly by the HL mapper client, e.g. the client would send packets to the IP address of the server (which then would automatically receive them), which would operate as a proxy and do a DNS lookup (based on application level information such HTTP request headers) to find the ultimate IP end point.

The high level mapper could also be integrated with the VPN Client and server, making the necessary interaction internal. Alternatively, they may be separated and the necessary APIs and packet markings are implemented using networking technologies.

The low level mapper does not need to be co-located with the VPN Server/Client or the high level mapper, as long as the necessary information is available in the packets allowing the mapping to QoS levels (i.e. IP addresses, ports, DSCP fields).

Figure 6:
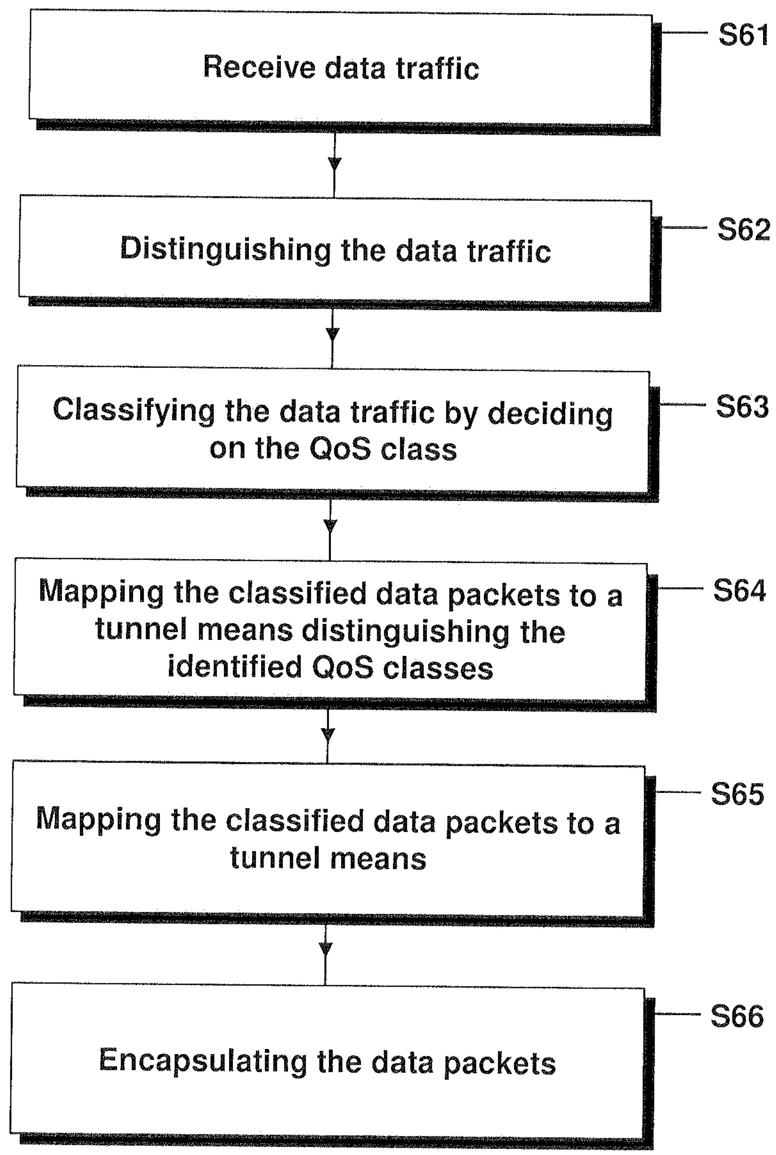
FIG. 6 shows a flowchart according to an embodiment of the invention.

In FIG. 6, the main steps are shown when the decision which tunnel to use is carried out in the VPN client or VPN server. In a step S61 the data traffic is received and in step S62 the data traffic is distinguished. In a next step S63 the data traffic is classified by determining the QoS parameter, i.e. by deciding on the QoS class. In a next step S64 the classified data packets are mapped to a tunnel means which can distinguish the identified QoS classes. In step S65 the classified data packets are mapped to one of the two tunnels based on the determined quality of service. In step S66 the data are encapsulated for the transmission.

Figure 7:
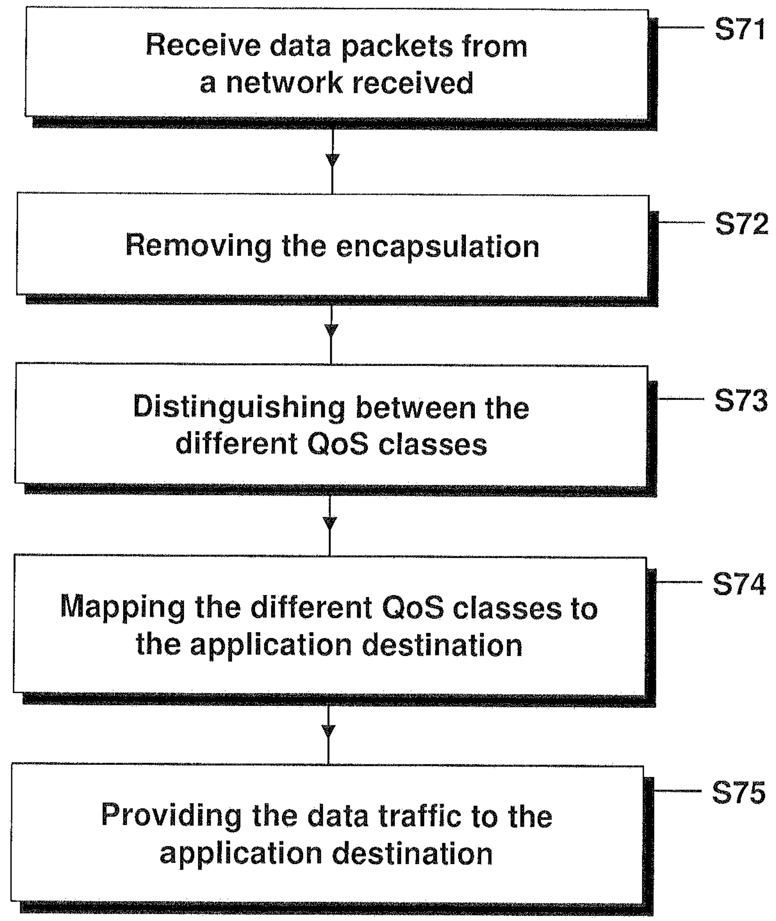
FIG. 7 shows a flowchart according to an embodiment of the invention.

In FIG. 7 the corresponding receiving side is shown. Either at the VPN client or VPN server the data packets are received from the network in step S71. In step S72 the encapsulation is removed and in step S73 the different QoS classes are distinguished. In step S74 the different QoS classes are mapped to the application destination and in step S75 the data are provided to the application destination.

Figure 10:
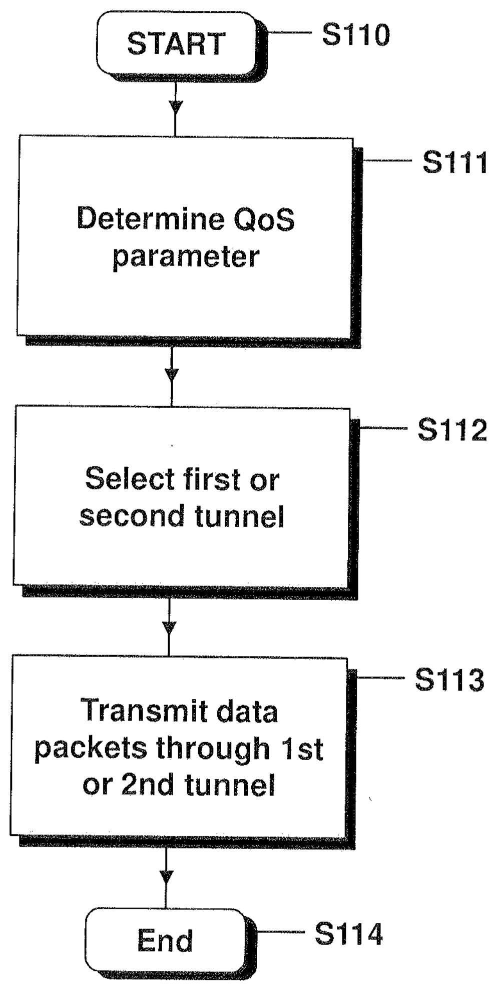
FIG. 10 is a flowchart comprising the main steps carried out in a VPN node when the selection about the quality of service is carried out in the VPN node.

In FIG. 10 a flowchart is shown summarizing the steps carried out in the VPN client or VPN server when the selection of the tunnel is carried out in the VPN server or VPN client. The method starts in step S110. In step S111 the QoS parameter is determined. The QoS parameter may be determined, e.g. using the information contained in the differentiated services code point (DSCP). The VPN node then either selects the first or the second tunnel determined on the required QoS parameter or service class and transmits the data through the first second tunnel in step S113. The method ends in step S114.

Figure 11:
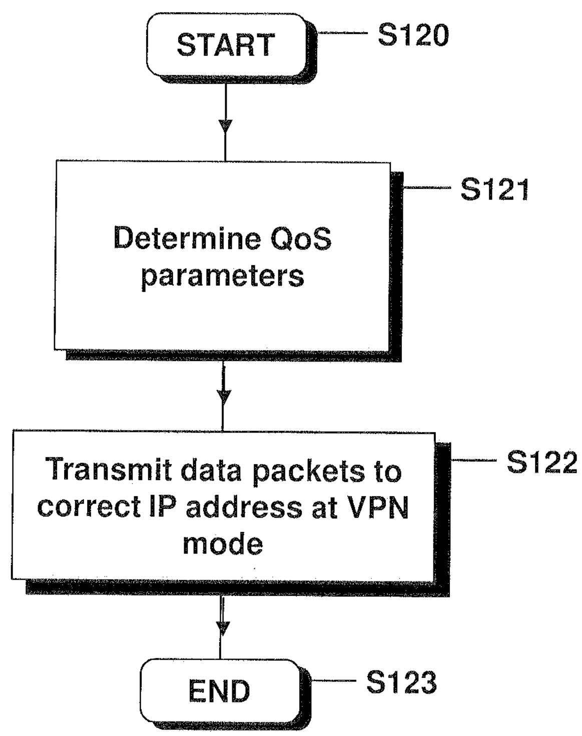
FIG. 11 shows a flowchart comprising the main steps carried out in a traffic mapping unit determining a quality of service.

In FIG. 11 a flowchart is shown comprising the main steps carried out by a traffic mapping unit which determines the required quality of service and transmits the packets to the corresponding IP address in the VPN node. The method starts in step S120. In the next step S121 the QoS parameter is determined, inter alia as described in further detail above. In the next step the data packets are transmitted to the corresponding IP address at the VPN node, as each IP address is associated with a tunnel (step S122). The method ends in step S123.

Figure 8:
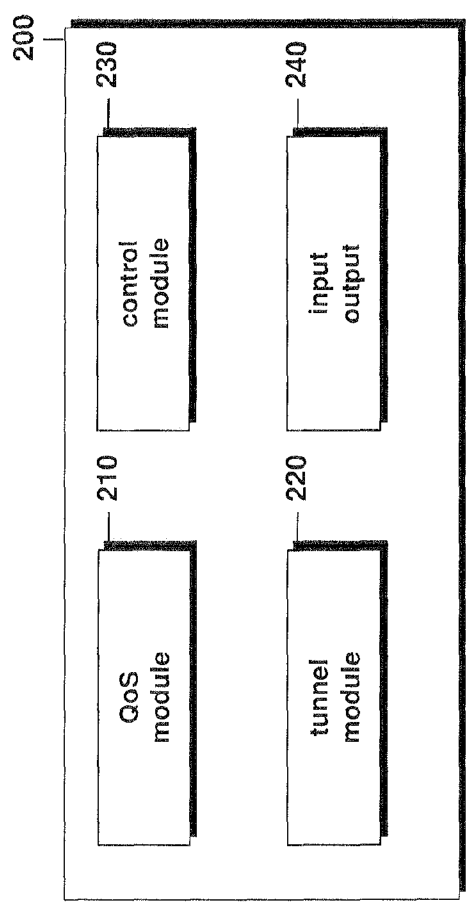
FIG. 8 is a schematic view of a VPN node of the invention.

In FIG. 8 a schematic view of a VPN node is shown which determines a required quality of service and selects a corresponding tunnel. In the example shown it is the VPN client 200. However, it should be understood that the same components may also be comprised in the VPN server. The VPN client comprises a QoS determining module 210 which determines the QoS parameter or class for the data packets of a data traffic. A tunnel module 220 or tunnel means is provided which is configured to set up the two different tunnels to the other VPN node. A control module 230 is provided to operate the VPN node. An input/output unit 240 is schematically shown which is used for a data exchange with the other components shown in FIGS. 2, 5 and 12-13.

Figure 9:
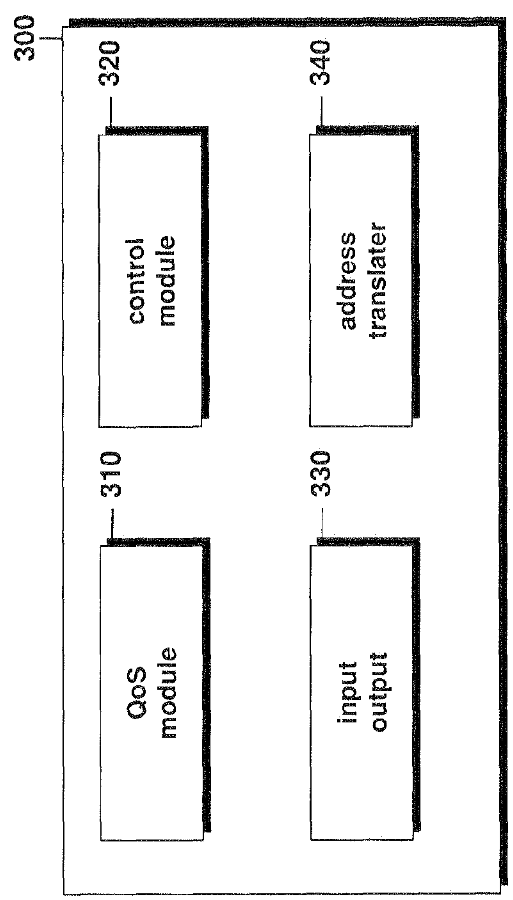
FIG. 9 is a schematic view of a traffic mapping unit of the invention.

In FIG. 9 a traffic mapping unit 300 is shown. The traffic mapping unit comprises a quality determining module 310, a control module 320 being provided to operate the traffic mapping unit. An address translation unit 340 may be provided to carry out an address translation as explained in connection with FIGS. 4 and 5 or 13. An input/output unit 330 is provided for the communication with the other components described above.

It should be understood that both the traffic mapping unit and the VPN node can comprise additional functions and components. For the sake of clarity only the functional components are shown which are necessary for the understanding of the invention. The components shown may be incorporated by software or hardware or by a combination of software or hardware.

Advantages of the Invention

General advantage is that it makes prioritization possible for VPN traffic.

Advantage compared to e.g. router based pre-classification is that it is more flexible in terms of functional placement and that it works for ordinary client VPN connections.

Advantage of the high level mapper control approach is that it minimizes the VPN client/server impact, making it easier to build on e.g. normal SSL or IPSec clients.

Advantages with the VPN Client and Server centric solution is that the HL mapper could be implemented as a DPI function as opposed to proxy function.

The invention claimed is:

1. A method for transmitting data packets of a data traffic between a sending device and a receiving device via a VPN client and a VPN server over a network using a secure encapsulation of the data packets, the method comprising the steps of:

establishing a first tunnel connecting the VPN client and the VPN server, wherein the first tunnel uses a secure encapsulation of the data packets;

establishing a second tunnel connecting the VPN client and the VPN server, wherein the second tunnel uses a secure encapsulation of the data packets;

receiving, by a traffic mapping unit, data packets of a data traffic between a sending device and a receiving device, wherein said data packets originate from an application in communication with the VPN client or VPN server;

passing the data packets, by the traffic mapping unit, to the VPN client or VPN server;

determining a Quality of Service (QOS) parameter for the data packets of said data traffic;

selecting, for the data packets, either the first tunnel connecting the VPN client and the VPN server or the second tunnel connecting the VPN client and the VPN server based on determined Quality of Service and before the data packets are securely encapsulated; and securely encapsulating the data packets of said data traffic between a sending device and a receiving device.

2. The method according to claim 1, wherein the selection of the first or second tunnel is carried out by the VPN client or VPN server.

3. The method according to claim 1, wherein a single IP address is assigned to a virtual interface where the data packets of the data traffic are received at the VPN client from the sending device, such that the selection of the first or second tunnel is transparent to the application in communication with the VPN client or VPN server.

4. The method according to claim 3, wherein the single IP address is the same for all data packets of the data traffic transmitted through the first or second tunnel and corresponds to the source address of an inner IP header of the tunneled data packets.

5. The method according to claim 3, wherein the single IP address is the same for all data packets of the data traffic transmitted through the first or second tunnel and corresponds to the destination address of an inner IP header of the tunneled data packets.

6. The method according to claim 3, wherein the two tunnels are requested by the VPN client, the single IP address being assigned to the tunnels at the VPN client by the VPN server.

7. The method according to claim 1, wherein the selection of the first or second tunnel is carried out in a traffic mapping unit which transmits the information about the selected first or second tunnel to the VPN client or VPN server.

8. The method according to claim 7, wherein the data packets are sent to a first IP address at a first virtual interface at the VPN client or to a second IP address of a second virtual interface at the VPN client in dependence on the determined QoS parameter, one IP address being associated with each of the tunnels.

9. The method according to claim 8, wherein the data traffic comprises a source IP address and a destination IP address, wherein, when the QoS parameter is determined, the source IP address is translated to either the first IP address or the second IP address in dependence on the determined QoS parameter when the data packets are sent to the VPN server.

10. The method according to claim 9, wherein, when the data traffic has passed through the first or second tunnel in dependence on the determined QoS parameter, the translated IP address is translated back to the source address at a traffic mapping unit at the VPN server or is translated back to the destination address at the traffic mapping unit at the VPN client.

11. The method according to claim 8, wherein the data traffic comprises a source IP address and a destination IP address, wherein, when the QoS parameter is determined, the destination IP address is translated to either the first IP address or the second IP address in dependence on the determined QoS parameter when the data packets are sent to the VPN client.

12. The method according to claim 1, wherein the QoS parameter is determined in a first layer, wherein the data traffic with the determined QoS parameter is provided to a second layer located below the first layer in a protocol stack where the data packets are mapped either to the first or second tunnel, wherein the data packets are transmitted in a third layer.

13. The method of claim 1, wherein selecting one of the first and second tunnel for a data packet based on the determined QoS comprises selecting one of a first port number and a second port number based on the determined QoS; and securely encapsulating the data packet comprises adding a header to the data packet, said header comprising a destination port number field storing the selected port number.

14. The method of claim 1, wherein selecting one of the first and second tunnel for a data packet based on the determined QoS comprises selecting one of a first IP address and a second IP address based on the determined QoS; and securely encapsulating the data packet comprises adding a header to the data packet, said header comprising a destination IP address field storing the selected IP address.

15. The method of claim 1, wherein receiving data packets comprises receiving a data packet comprising a header having a destination IP address field storing a first IP address, selecting the first or second tunnel for a data packet based on the determined QoS comprises selecting one of a second IP address and a third IP address based on the determined QoS, and securely encapsulating the data packet comprises modifying the destination IP address field of the header by replacing the first IP address stored in the field with the selected IP address.

16. A virtual private network node configured to transmit data packets of a data traffic between a sending device and a receiving device via another virtual private network node over a network using a secure encapsulation of the data packets, the virtual private network node comprising:

a processor coupled to a non-transitory computer-readable medium, the processor configured to:

receive, by a traffic mapping unit, data packets of a data traffic between a sending device and a receiving device, wherein said data packets originate from an application in communication with the VPN client or VPN server;

pass the data packets, by the traffic mapping unit, to the VPN client or VPN server;

determine a Quality of Service (QoS) parameter for the data packets of said data traffic;

set up a first tunnel connecting the virtual private network node with the other virtual private network node and configured to set up a second tunnel connecting the virtual private network node with the other virtual private network node, said first and second tunnels connecting the virtual private network node with the other virtual private network node using a secure encapsulation of the data packets;

select either the first tunnel or the second tunnel for the data traffic based on the determined Quality of Service and before the data packets are securely encapsulated; and securely encapsulate the data packets of said data traffic between a sending device and a receiving device.

17. A system comprising a VPN client and a VPN server configured to transmit data packets of a data traffic between a sending device and a receiving device via the VPN client and the VPN server over a network using a secure encapsulation of the data packets, the system comprising:

a processor coupled to a non-transitory computer-readable medium, the processor configured to:

receive, by a traffic mapping unit, data packets of a data traffic between a sending device and a receiving device, wherein said data packets originate from an application in communication with the VPN client or VPN server;

pass the data packets, by the traffic mapping unit, to the VPN client or VPN server;

determine a Quality of Service (QoS) parameter for the data packets of said data traffic;

set up a first tunnel connecting the VPN client with the VPN server and configured to set up a second tunnel connecting the VPN client with the VPN server, said first and second tunnels connecting the VPN client and the VPN server using a secure encapsulation of the data packets;

select either the first tunnel or the second tunnel for the data traffic based on the determined Quality of Service and before the data packets are securely encapsulated, wherein the processor is configured to set up the first tunnel and the second tunnel in such a way that the two tunnels have a single IP address at the VPN client; and securely encapsulate the data packets of said data traffic between a sending device and a receiving device.

18. The system according to claim 17, wherein the processor is further configured to set up the first tunnel and the second tunnel in such a way that the two tunnels have a single IP address at the VPN server.

19. A traffic mapping unit comprising:

a processor coupled to a non-transitory computer-readable medium, the processor configured to:

receive data packets of a data traffic between a sending device and a receiving device, wherein said data packets originate from an application in communication with the VPN client or VPN server;

pass the data packets to the VPN client or VPN server;

determine a Quality of Service parameter for the data packets of said data traffic transmitted between a sending device and a receiving device via said VPN client and VPN server using a secure encapsulation of the data packets;

select for the data traffic either a first IP address of the VPN client and which is associated with a first tunnel connecting the VPN client with the VPN server or a second IP address of the VPN client and which is associated with a second tunnel connecting the VPN client and with the VPN server based on the determined QoS parameter and before the data packets are securely encapsulated; and a transmitter configured to transmit data traffic to either the first or second IP address based on the selection for the data traffic of the first or second IP address.

20. The traffic mapping unit according to claim 19, further comprising an address translating unit configured to translate at least one or more of a source IP address and a destination IP address in a header of the data traffic, wherein the address translating unit is configured to translate the source IP address to either the first IP address or the second IP address in dependence on the determined QoS parameter when the data packets are sent to the VPN server.

21. The traffic mapping unit according to claim 19, further comprising an address translating unit configured to translate at least one or more of a source IP address and a destination IP address in a header of the data traffic, wherein the address translating unit is configured to translate the destination IP address to either the first IP address or the second IP address in dependence on the determined QoS parameter when the data packets are sent to the VPN client.

22. The traffic mapping unit according to claim 19, wherein the processor is further configured to determine the QoS parameter before the secure encapsulation of the data packets is carried out at the VPN client or VPN server.

23. A system comprising a traffic mapping unit and a VPN client, the traffic mapping unit comprising:

a processor coupled to a non-transitory computer-readable medium, the processor configured to:

receive data packets of a data traffic between a sending device and a receiving device, wherein said data packets originate from an application in communication with the VPN client or VPN server;

pass the data packets to the VPN client or VPN server;

determine a Quality of Service parameter for data packets of a data traffic transmitted between a sending device and a receiving device via VPN client and VPN server using a secure encapsulation of the data packets;

select for the data traffic either a first IP address of the VPN client and which is associated with a first tunnel connecting the VPN client with the VPN server or a second IP address of the VPN client and which is associated with a second tunnel connecting the VPN client and with the VPN server based on the determined QoS parameter and before the data packets are securely encapsulated; and a transmitter configured to transmit data traffic to either the first or second IP address at the VPN client based on the selection for the data traffic of the first or second IP address, wherein the VPN client contains a first virtual interface where the data packets transmitted by the traffic mapping unit are received at the VPN client to which the first IP address is assigned, the VPN client containing a second virtual interface where the data packets are received at the VPN client to which the second IP address is assigned.

* * * * *